(12) United States Patent
Kawai

(10) Patent No.: US 11,436,455 B2
(45) Date of Patent: Sep. 6, 2022

(54) IMAGE PROCESSING DEVICE, PRINTING DEVICE, PRINTING SYSTEM, AND IMAGE PROCESSING METHOD

(71) Applicant: SEIKO EPSON CORPORATION, Tokyo (JP)

(72) Inventor: Kiyoshi Kawai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/340,229

(22) Filed: Jun. 7, 2021

(65) Prior Publication Data
US 2021/0383178 A1 Dec. 9, 2021

(30) Foreign Application Priority Data

Jun. 8, 2020 (JP) .............................. JP2020-099385

(51) Int. Cl.
*G06K 15/02* (2006.01)

(52) U.S. Cl.
CPC ..... *G06K 15/1881* (2013.01); *G06K 15/1859* (2013.01)

(58) Field of Classification Search
CPC .................. G06K 15/1881; G06K 15/1859
See application file for complete search history.

(56) References Cited

U.S. PATENT DOCUMENTS

2016/0295077 A1* 10/2016 Kakutani ........... G06K 15/1881
2018/0096234 A1* 4/2018 Yamada .................... H04N 1/52

FOREIGN PATENT DOCUMENTS

JP 2017-060015 A 3/2017

* cited by examiner

*Primary Examiner* — Quang N Vo
(74) *Attorney, Agent, or Firm* — Global IP Counselors, LLP

(57) ABSTRACT

An image processing method configured to process an image constituted by a plurality of pixels arranged two-dimensionally includes the steps of dividing the image into a plurality of blocks, and comparing image data of the pixel included in a first block as one of the blocks divided into with a first threshold value, and converting the image data into first dot data representing whether to form a dot using an error diffusion method. Further, processing of comparing image data of the pixel included in a second block as a block adjacent to the first block with a second threshold value prepared in advance, and converting the image data into second dot data representing whether to form a dot using an error diffusion method is performed independently of a first processing section. On this occasion, the first threshold value and the second threshold value include variable components periodically varying along two-dimensional arrangement directions of the pixels, respectively, and the variable components are provided with the same phase at a junction between the first block and the second block.

9 Claims, 11 Drawing Sheets

FIG. 9 mod(x, 8)
2   3   4   5   6   7   0   1   2 cos {mod(x, 8) · π/4}

| 0 | -0.7 | -1 | -0.7 | 0 | 0.7 | 1 | 0.7 | 0 | x: 90  91  92  93  94  95  96  97  98

| | | | | | | | | |

IMAGE PROCESSING DEVICE, PRINTING DEVICE, PRINTING SYSTEM, AND IMAGE PROCESSING METHOD

The present application is based on, and claims priority from JP Application Serial Number 2020-099385, filed Jun. 8, 2020, the disclosure of which is hereby incorporated by reference herein in its entirety.

BACKGROUND

1. Technical Field

The present disclosure relates an image processing technology using error diffusion.

2. Related Art

As image processing excellent in image quality, there has ever been known an error diffusion method. In the image processing using the error diffusion method, a grayscale value provided to each pixel is converted into a distribution of dots with smaller number of gray levels. On that occasion, since a density error occurring in each pixel is dispersed to unprocessed pixels on the periphery of the pixel currently processed, the processing takes time. Therefore, a variety of devices for shortening the time necessary for the image processing by performing parallel processing are made. For example, in JP-A-2017-60015, an image is divided into a plurality of blocks, and error diffusion units for performing processing using the error diffusion method are disposed for the respective blocks to thereby realize the parallel processing. On this occasion, a boundary part between the blocks is provided with a width, the error to be diffused to a boundary area in the processing in each of the blocks is stored in another memory, and the error diffusion process in the boundary area is performed using the error thus stored.

However, in such a method, it is necessary to prepare a memory area which can be accessed fast from each of the blocks so as to be able to store and retrieve the error diffused to the boundary area from the plurality of blocks, and it is necessary to build such a memory area into the same system. Therefore, it is difficult to dispose the error diffusion units for processing the respective blocks in a different system which does not share the memory. Further, since the range in which the error is diffused in the boundary area varies depending on the number of the blocks subject to the processing and the configuration of the division, it is also difficult to realize the scalability of segmented processing.

SUMMARY

As a first aspect of the present disclosure, there is provided an image processing device for processing an image constituted by a plurality of pixels arranged two-dimensionally. The image processing device includes a dividing section configured to divide the image into a plurality of blocks, a first processing section configured to compare image data representing a gray level of the pixel included in a first block as one of the blocks divided into with a first threshold value prepared in advance, and convert the image data into first dot data representing whether to form a dot using an error diffusion method, and a second processing section configured to perform processing of comparing image data representing a gray level of the pixel included in a second block as a block adjacent to the first block with a second threshold value prepared in advance, and converting the image data into second dot data representing whether to form a dot using an error diffusion method independently of the first processing section, wherein the first threshold value and the second threshold value in the first and second processing sections include variable components periodically varying along two-dimensional arrangement directions of the pixels, respectively, and the variable components are provided with the same phase at a junction between the first block and the second block.

As a second aspect of the present disclosure, there is provided a printing device. The printing device includes the image processing device described above, and a dot formation section configured to form a dot on a print medium in accordance with the first and second dot data obtained by performing the conversion.

Further, as a third aspect of the present disclosure, there is provided a printing system. The printing system includes a dividing section configured to divide an original image constituted by a plurality of pixels arranged two-dimensionally into a plurality of blocks, a first processing section configured to compare first image data representing a gray level of the pixel included in a first block as one of the blocks divided into with a first threshold value prepared in advance, and convert the first image data into first dot data representing whether to form a dot using an error diffusion method, a second processing section configured to perform processing of comparing second image data representing a gray level of the pixel included in a second block as a block adjacent to the first block with a second threshold value prepared in advance, and converting the second image data into second dot data representing whether to form a dot using an error diffusion method, and a printing section configured to combine the first dot data received and the second dot data with each other to print an image corresponding to the original image on a print medium, wherein the first processing section and the second processing section are respectively disposed in a first device and a second device coupled to each other via a line, and the first threshold value and the second threshold value in the first and second processing sections include variable components periodically varying along two-dimensional arrangement directions of the pixels, respectively, and the variable components are provided with the same phase at a junction between the first block and the second block.

As a fourth aspect of the present disclosure, there is provided an image processing method. The image processing method is an image processing method configured to process an image constituted by a plurality of pixels arranged two-dimensionally including the steps of dividing the image into a plurality of blocks, performing first processing of comparing image data representing a gray level of the pixel included in a first block as one of the blocks divided into with a first threshold value prepared in advance, and converting the image data into first dot data representing whether to form a dot using an error diffusion method, and performing processing of comparing image data representing a gray level of the pixel included in a second block as a block adjacent to the first block with a second threshold value prepared in advance, and converting the image data into second dot data representing whether to form a dot using an error diffusion method independently of the first processing, wherein the first threshold value and the second threshold value include variable components periodically varying along two-dimensional arrangement directions of the pixels, respectively, and the variable components are provided with the same phase at a junction between the first block and the second block.

BRIEF DESCRIPTION OF THE DRAWINGS

FIG. 9 is an explanatory diagram showing an example of a variation of the threshold value when 8 pixels per cycle is assumed.

DESCRIPTION OF EXEMPLARY EMBODIMENTS

A. First Embodiment

[1] Hardware Configuration

Figure 1:
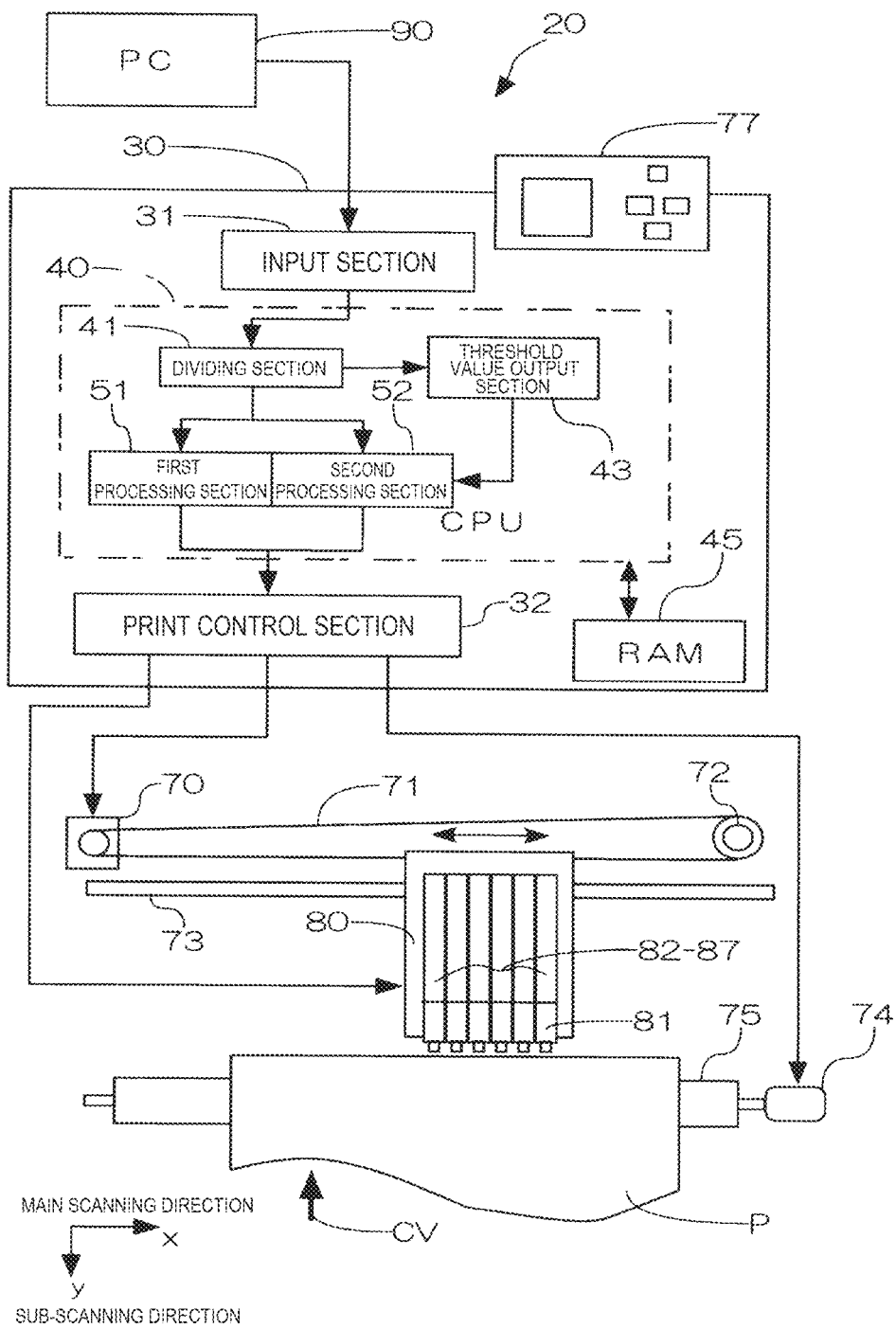
FIG. 1 is a schematic configuration diagram of a printer as an image processing device according to a first embodiment.

FIG. 1 is a schematic configuration diagram of a printer 20 as an image processing device according to a first embodiment. The printer 20 is coupled to a computer (hereinafter abbreviated as PC in some cases) 90 for outputting an image, and prints an original image ORG output by the PC 90 on a print medium P. The printer 20 is a serial type inkjet printer for performing bidirectional printing using color ink. As shown in the drawing, the printer 20 is constituted by a mechanism for conveying a print medium P with a paper feed motor 74, a mechanism for reciprocating a carriage 80 in an axial direction of a platen 75 with a carriage motor 70, a mechanism for driving a print head 81 mounted on the carriage 80 to perform ejection of the ink and dot formation, and a control unit 30 for managing interchanges of signals between the motor 74, the carriage motor 70, the print head 81, the PC 90, and an operation panel 77.

The mechanism for reciprocating the carriage 80 in the axial direction of the platen 75 is constituted by a slide shaft 73 disposed in parallel with the axis of the platen 75 and slidably holding the carriage 80, a pulley 72 for stretching a drive belt 71 as an endless belt with the carriage motor 70, and so on. An action of changing a print position due to a motion of the carriage 80 along the axial direction of the platen 75 is called main scanning, and the directions of the main scanning are each called a main scanning direction (or both called main scanning directions). In the following description, it is assumed that a pixel position in the main scanning direction is represented as a coordinate x. Further, an action of changing the print position by the print head 81 due to the conveyance of the print medium P by a rotation of the platen 75 is called sub-scanning, and an opposite direction to the direction (the arrow CV) in which the print medium P is conveyed is called a sub-scanning direction. It is assumed that the pixel position in the sub-scanning direction is represented as a coordinate y.

On the carriage 80, there are mounted ink cartridges 82 through 87 for color ink respectively containing cyan ink C, magenta ink M, yellow ink Y, black ink K, light cyan ink Lc, and light magenta ink Lm as the color ink. In the print head 81 in the lower part of the carriage 80, there is formed a nozzle array corresponding to the color ink of the respective colors described above. When mounting these ink cartridges 82 through 87 on the carriage 80 from above, it becomes possible to supply the ink from each of the cartridges to the print head 81.

The control unit 30 is provided with an input section 31, a CPU 40, a RAM 35, and a print control section 32. The CPU 40 is provided inside with a ROM as a well-known device and so on. The CPU 40 develops a program stored in the ROM in the RAM 35 as needed, and then executes the program to thereby control overall operations of the printer 20. The CPU 40 executes a control program to thereby function as a division section 41, a threshold value outputting section 43, a first processing section 51, and a second processing section 52. A function of each of the sections will be described later in detail. The CPU 40 receives the original image ORG from the PC 90 via the input section 31, processes the original image ORG with the first processing section 51 and the second processing section 52 to generate dot data for printing. The CPU 40 controls the print head 81 and a variety of motors described above, and so on via the print control section 32 using the dot data generated to perform printing on the print medium P.

[2] Image Processing

Figure 2:
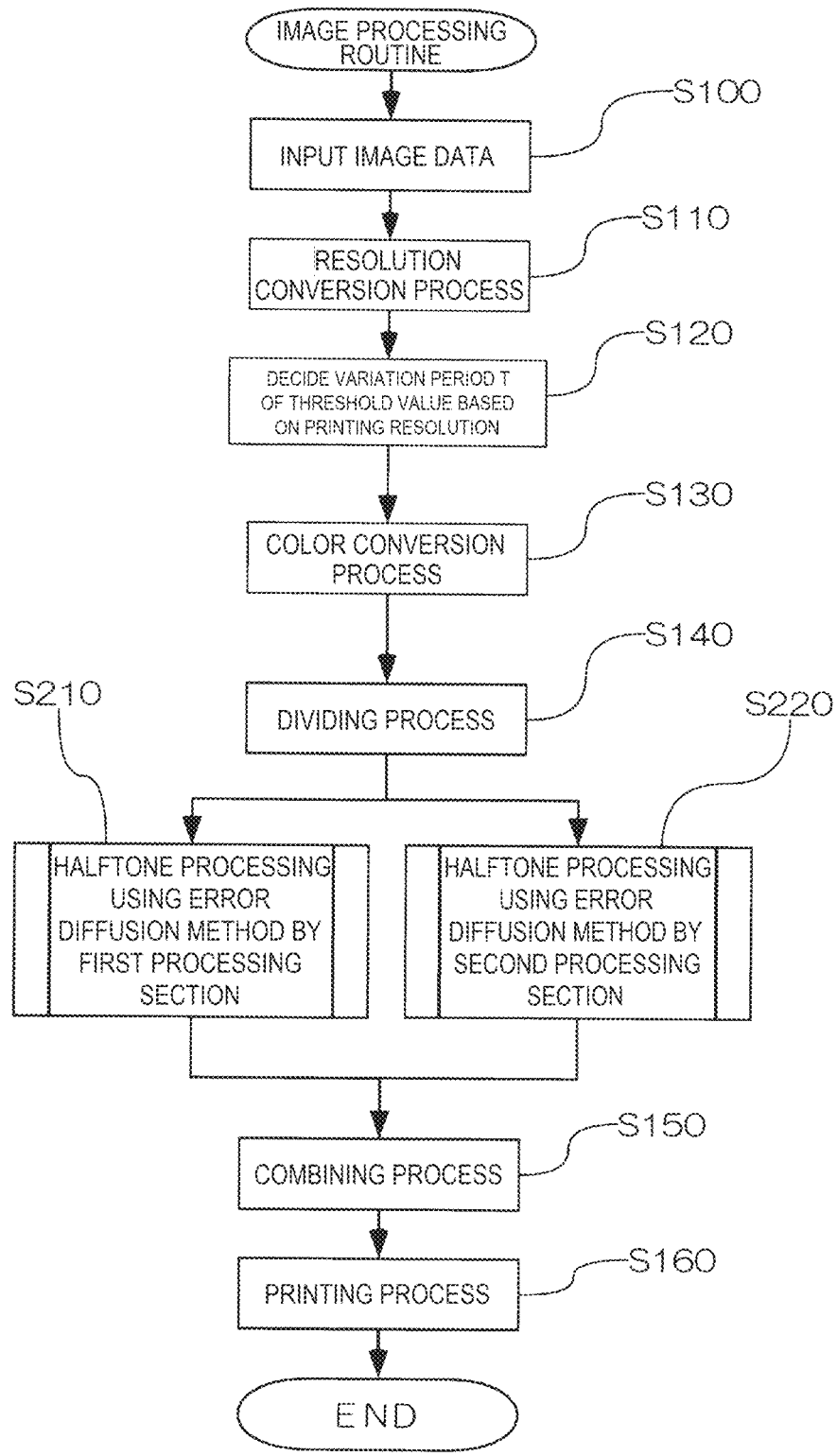
FIG. 2 is a flowchart showing a flow of a printing process including image processing in the printer.

The image processing routine in the printer 20 will be described using FIG. 2. The printer 20 starts the image processing routine shown in the drawing when an instruction of printing is received from the PC 90 to first perform (step S100) processing of inputting the image data of the original image ORG from the PC 90 via the input section 31. In the present embodiment, the original image ORG is a full-color image, the size thereof is represented by 2(xm+1) pixels in the main scanning direction and (yn+1) pixels in the sub-scanning direction, and the resolution is 600 dpi. Once the original image ORG is input, then, a resolution conversion is performed (step S110). The resolution conversion is performed when a resolution of the original image ORG and a printable resolution are different from each other. For example, when the resolution of the original image ORG is 600 dpi, and the resolution of 300 dpi is designated as the printing resolution, the resolution conversion of grouping the 2×2 pixels of the original image ORG together into one pixel is performed to thereby reduce a load in a halftone processing in a subsequent process.

Then, there is performed (step S120) processing of obtaining a variation period T of the threshold value based on the printing resolution. The variation period T of the threshold value means a period of varying the threshold value ThE used in the halftone processing, namely a value representing how many pixels the threshold value is varied by. In general, the variation period T is at least a value no smaller than 2 since it represents the variation, and is decided that the spatial frequency of the variation is no smaller than about 3/mm taking the characteristics of the eyes of a human who visually recognizes the image into consideration. For example, when the printing resolution is 300 dpi, the variation period T is obtained as about 4 pixels solving the following formula (1).

$$3 \approx (300/25.4)/T \tag{1}$$

When the printing resolution is 600 dpi, the variation period T becomes about 8 pixels in a similar manner. In the present embodiment, it is assumed that the variation period T is a value of 4, namely the threshold value ThE described later varies every 4 pixels as one cycle. The calculation of the threshold value ThE using the period T will be described later in detail.

Since the image data input is multiple-tone data in an RGB format, a color conversion process (step S130) for converting the image data into data in a CMYK format handled by the printer 20 is then performed. Obviously, the format of the image data is not particularly limited providing the format can be handled by the printer 20, and it is possible to adopt, for example, the data in the CMYK format. Further, the number of the bits can be 8 bits as a typical value, and an arbitrary number of bits corresponding to the image quality can be adopted. When the image data is input in the CMYK format, the color conversion process (step S130) can be omitted. The input of the image data by the input section 31 can directly be performed via a wired connection to the PC 90, or can be performed via a network such as the intranet (registered trademark). Obviously, the input can be performed via a wireless connection, or it is possible to directly receive a file of the image data using a memory card or the like.

Figure 3:
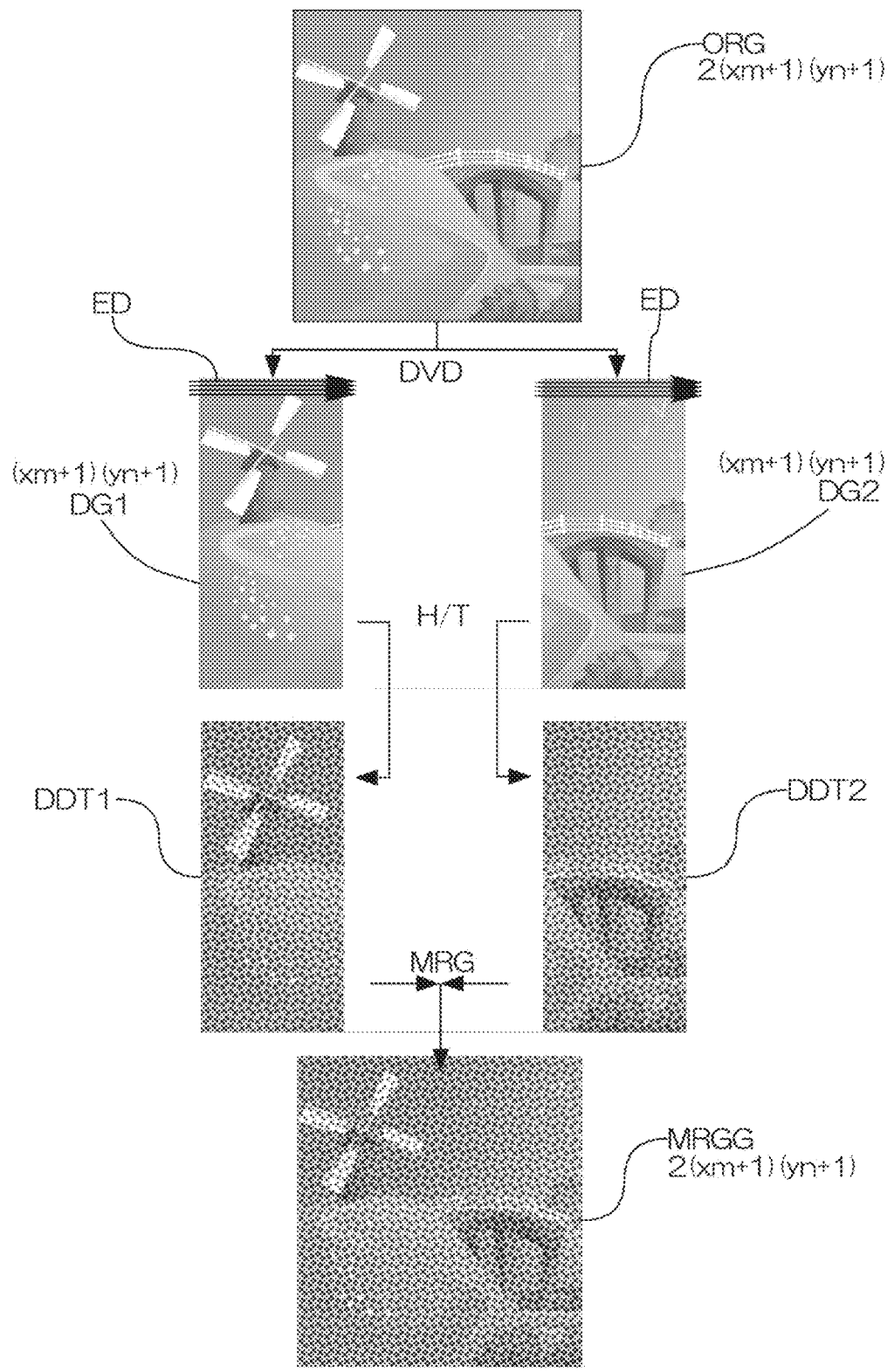
FIG. 3 is an explanatory diagram showing how image data is processed by the image processing.

Subsequently, processing of dividing the image data thus input is performed (step S140). The division of the image data is the processing of dividing the original image ORG into a plurality of divided images as illustrated in FIG. 3. In this example, the original image ORG is divided along the main scanning direction into image data corresponding to a first block DG1 and a second block DG2 thus divided. In the present embodiment, it is assumed that the first block DG1 and the second block DG2 are blocks equal in size to each other, regarding a y direction as the sub-scanning direction, there are arranged n+1 pixels having values of 0 through yn, and regarding an x direction as the main scanning direction, there are arranged m+1 pixels having values of 0 through xm. Therefore, (m+1) (n+1) pixels are included in each of the blocks as a result. It should be noted that when an odd number of pixels are arranged in the main scanning direction in the original image ORG, it is sufficient to perform the division after adding a dummy pixel corresponding to one pixel to a right end in the main scanning direction of the original image ORG, and not to use a processing result with respect to the pixel at the right end of the second block DG2. In FIG. 3, the dividing process described above is denoted by a reference symbol DVD. Here, the main scanning direction x coincides with a direction in which processing ED of the error diffusion is performed in an error diffusion process described later.

After dividing the original image ORG, there is performed (step S145) processing of obtaining a displacement a for making the first block DG1 and the second block DG2 coincide in phase with each other when applying the variation period T described above to the first block DG1 and the second block DG2. When the number of the pixels in the main scanning direction of the first block DG1 is a multiple of the variation period T, the phase of the variation period T continues between the end in the main scanning direction of the first block DG1 and the start in the main scanning direction of the second block DG2. In the present embodiment, since the original image ORG is divided into two equal parts, the number of the pixels in the main scanning direction of the first block DG1 is not necessarily a multiple of the variation period T. Therefore, the displacement a for making the phase of the variation period T continue between the end in the main scanning direction of the first block DG1 and the start in the main scanning direction of the second block DG2 is obtained by the following formula (2).

$$\alpha = \mathrm{mod}(xm, 4) + 1 \tag{2}$$ where $\alpha = 0$ when $\alpha = 4$ When supposedly the coordinate xm of the pixel at the end in the main scanning direction of the first block DG1 is a value of 98, $\alpha = 3$ is obtained. The displacement a is used in the calculation of the threshold value ThE in the second block DG2 as described later.

Subsequently, the CPU 40 of the printer 20 executes the processing (step S210) by the first processing section and the processing (step S220) by the second processing section in parallel to each other. Here, executing the processing in parallel to each other does not include alternately executing the processing to thereby executing the processing in parallel to each other in a pseudo manner, but means substantively executing the processing in parallel to each other with the two processing sections. The first processing section 51 and the second processing section 52 can be provided with a configuration in which the processing is assigned to each of cores in the CPU 40 as a multi-core processor, and the parallel processing is performed, or can also be provided with respective hardware units for executing the processing independently of each other.

The processing by the first processing section 51 and the processing by the second processing section 52 will be described later in detail, but either of the processing is processing of performing the halftone processing on the multi-tone image data using the error diffusion method to thereby convert the multi-tone image data into dot data corresponding to ON/OFF of an ink droplet. In FIG. 3, the processing is represented as a reference symbol H/T, and the dot data obtained by the conversion by the first processing section 51 is represented as first data DDT1, and the dot data obtained by the conversion by the second processing section 52 is represented as second data DDT2.

In combining processing of performing (step S150) processing of combining the first dot data DDT1 and the second dot data DDT2 with each other after the processing by the first processing section 51 and the processing by the second processing section 52 are terminated, and thus, these dot data are formed, the first dot data DDT1 and the second dot data DDT2 are only coupled to each other in accordance with the arrangement of the original image. In FIG. 3, the processing is denoted by a reference symbol MRG, and the image data having been combined is illustrated as MRGG. It should be noted that in FIG. 3, the first dot data DDT1 and so on are schematically shown in a configuration with hatching in order to show a difference from images of the first block DG1 thus divided and so on, namely the images on which the error diffusion process has not been performed, and are different from the configuration of the dot data actually formed.

Using the image MRGG obtained by combining the first block DG1 and the second block DG2 with each other in such a manner, there is performed (step S160) processing of printing the image MRGG on the print medium P. This terminates the image processing accompanied by printing. It should be noted that when performing the printing process, in order to complete the image with a plurality of passes of the carriage 80, the timing of pixel formation corresponding to the nozzle arrangement in the carriage 80 and the arrangement of the pixels fail to coincide with each other in some cases. In such cases, it is sufficient to perform so-called interlace processing of exchanging the dot data in accordance with the drive timing of each of the nozzles.

Figure 4:
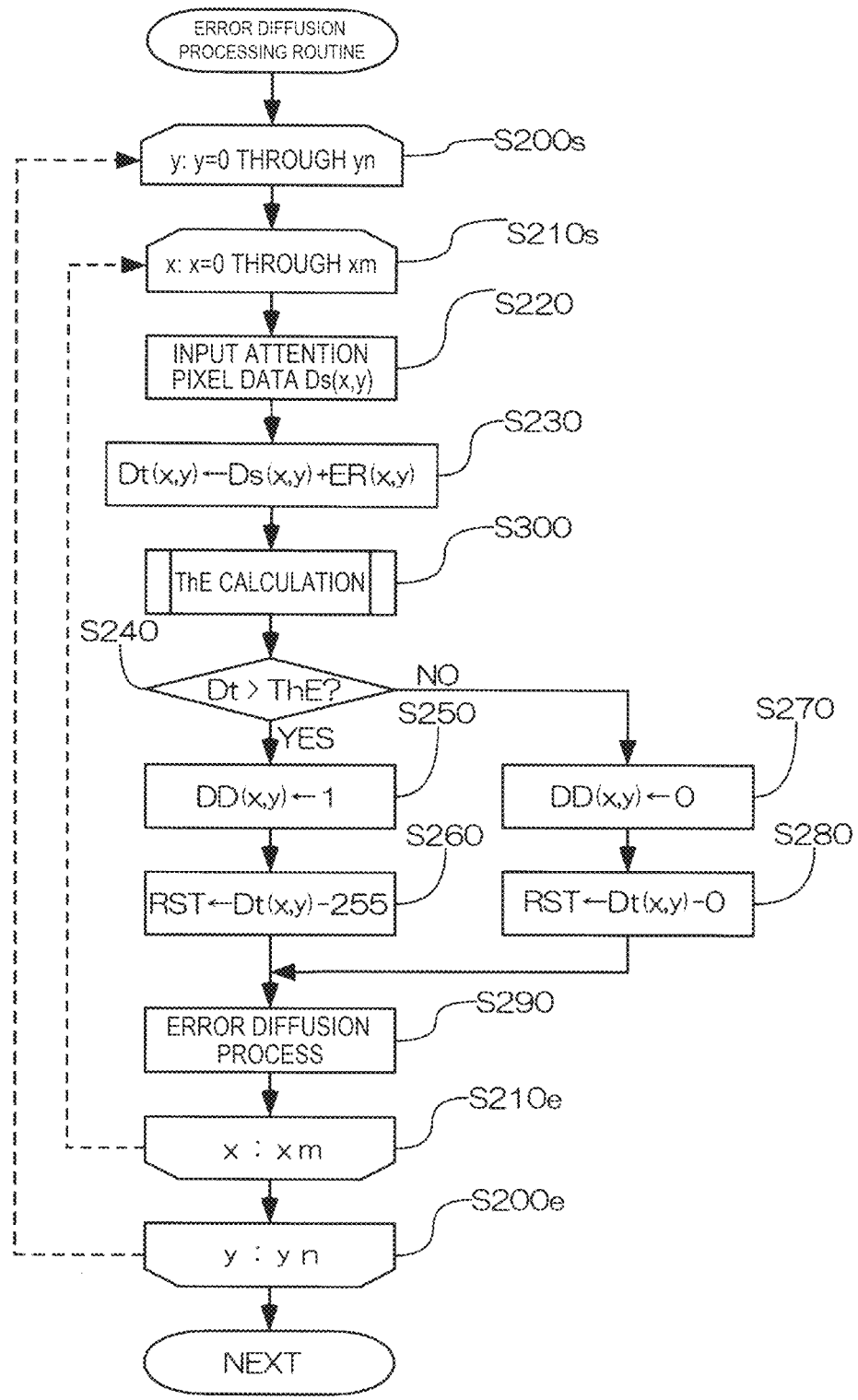
FIG. 4 is a flowchart showing an error diffusion processing routine in the image processing.

Then, processing to be performed by the first processing section 51 and the second processing section 52 will be described. FIG. 4 is a flowchart showing the error diffusion processing routine to be executed by the first processing section 51 and the second processing section 52. When the first processing section 51 and the second processing section 52 receive the image data of the first block DG1 and the second block DG2 obtained by the division in the dividing process (step S140), the first processing section 51 and the second processing section 52 individually perform the same processing described hereinafter on the image data.

In the processing routine shown in FIG. 4, the processing is performed (steps S200s, S210s) on the plurality of pixels constituting the first block DG1 and the second block DG2 repeatedly with a double loop from the value of 0 to the value of yn with respect to the coordinate y in the sub-scanning direction, and in the values of 0 through xm with respect to the coordinate x in the main scanning direction taking upper left of the image as an origin, namely the coordinates (0,0). The pixel on which the processing is performed is hereinafter referred to as an attention pixel *. Specifically, the processing in the steps S220 through S290 on the attention pixel is repeated between the step S210s and the step S210e, and further, the processing is repeated between the step S200s and the step S200e. Inside the loop, the processing is first performed on a raster of y=0 in the sub-scanning direction while sequentially moving the attention pixel*(x,y) from the first pixel (0,0) to the trailing pixel (xm, 0) of that raster, and when the processing on all of the pixels on one raster is completed (steps S210s through S210e), then, the processing of incrementing the coordinate y in the sub-scanning direction by a value of 1, resetting the coordinate x in the main scanning direction to an initial value (the value of 0), and then performing the processing on that raster is repeated (steps S200s through S200e) until the coordinate y in the sub-scanning direction becomes yn corresponding to the last raster.

When such a double loop process is started, first, processing of inputting the image data Ds (x,y) of the attention pixel is performed (step S220). The image data Ds (x,y) is grayscale data provided to the pixel of the original image ORG. Originally, the image data Ds (x,y) includes data of the respective colors of CMYK, the error diffusion process is also performed on each of the colors. The processes with respect to the respective colors are assumed in the present embodiment as independent processes, and are therefore not particularly distinguished from each other, but are described as a single process here.

Then, processing of adding a diffusion error ER (x,y) to the image data Ds (x,y) of the attention pixel to obtain corrected image data Dt (x,y) is performed (step S230). Here, the diffusion error ER (x,y) means a summation of the error diffused from the pixel having already been processed to the attention pixel. The diffusion error ER (x,y) is stored in an error buffer EDB as an area prepared in the RAM 35. Then, processing of calculating the threshold value ThE is performed (step S400). The threshold value ThE is a judgment value used when judging whether to form a dot in the attention pixel. In the present embodiment, the threshold value ThE varies in value depending on the coordinates (x,y) of the attention pixel. The method of calculating the threshold value ThE will be described later in detail.

After obtaining the threshold value ThE, processing of comparing in magnitude between the threshold value ThE and the corrected image data Dt (x,y) at the coordinates of the attention pixel is performed (step S240), and when the corrected image data Dt (x,y) is higher than the threshold value ThE, a value of 1 is input (step S250) to the dot data DD (x,y) representing that a dot is formed, and further, a difference between the corrected image data Dt (x,y) and a maximum grayscale value 255 is obtained, and is then stored (step S260) as an error value RST. On the other hand, when the corrected image data Dt (x,y) is no higher than the threshold value ThE, a value of 0 is input (step S270) to the dot data DD (x,y) representing that a dot is not formed, and further, a difference between the corrected image data Dt (x,y) and a minimum grayscale value 0 is obtained, and is then stored (step S280) as the error value RST. The dot data DD (x,y) is stored in the RAM 35.

The error value RST obtained in the steps S260, S280 represents how much a density error has been generated by forming the dot or failing to form the dot with respect to the density (intensity) for the pixel to express in accordance with the grayscale value of the attention pixel. For example, when the density corresponding to the grayscale value of the attention pixel is a value of 196, and the threshold value ThE is supposedly a value of 128, the dot is formed in accordance with the judgment in the step S240 as a result. When the dot is formed in the attention pixel, the attention pixel is filled, and the density has a value of 255 corresponding to the maximum density. However, since the original density is a value of 196, the density becomes excessive as much as a difference 59 between the values, and thus, a density error occurs as a result. When the density of the attention pixel is no higher than the threshold value ThE, the dot is not formed, and therefore, the density becomes insufficient, and the density error occurs. The error value RST takes a positive or negative value corresponding to the shortage or the excess in density occurring in every pixel as described above.

Figure 5:
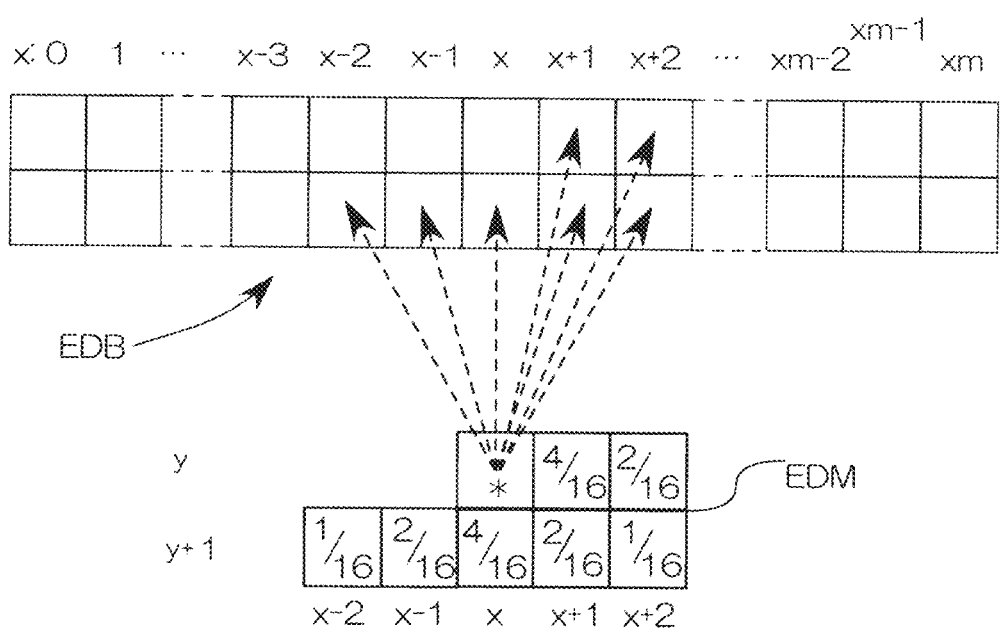
FIG. 5 is an explanatory diagram showing how a density error is distributed to the periphery of an attention pixel.

Therefore, in the subsequent step S290, there is performed processing of diffusing the error value RST to the periphery of the attention pixel. FIG. 5 shows how the processing is performed. In the drawing, the attention pixel is represented as "*." Assuming the coordinates of the attention pixel * as (x,y), 4/16 of the error value RST is distributed to each of the pixel (x+1, y) and the pixel (x, y+1) in the embodiment. An error diffusion mask EDM shows a range in which a part of the error value RST is distributed in such a manner. In this example, the error diffusion mask EDM is set so that 2/16 of the error value RST is distributed to each of the pixel (x+2, y), the pixel (x+1, y+1), and the pixel (x−1, y+1), 1/16 of the error value RST is distributed to each of the pixel (x+2, y+1), and the pixel (x−2, y+1). In the present embodiment, since all of the elements of the error diffusion mask EDM are set to $2^P/16$ (P=0, 1, or 2), it is possible to obtain the error to be distributed to each of the pixels only by shifting the error value RST expressed as an 8-bit binary number rightward as much as (4−P) bits, which is convenient. Obviously, it is possible for the values of the error diffusion mask EDM to be set as values other than power-of-two values. It is also possible to assume that the error diffusion mask EDM is provided with distribution ratios equivalent to, for example, a Gaussian filter. Further, it is possible for the range of the error diffusion to be narrower, or broader, and it is also possible to arrange that the error diffusion mask EDM to be applied is switched between different ones in accordance with, for example, the grayscale value of the attention pixel.

As described hereinabove, when the density error occurs in the attention pixel *, the error value RST reflecting the density error is distributed to the pixels surrounding the attention pixel * and in the range determined in the error diffusion mask EDM at the predetermined rate according to the error diffusion process shown in FIG. 4. Specifically, the error calculated to be distributed to each of the surrounding pixels is stored in an error buffer EDB prepared in the RAM 35. On this occasion, when a value has already been input to the error buffer EDB, the error is added thereto. Whether or not the dot is formed in the attention pixel * basically follows the magnitude of the grayscale value of each of the pixels in the original image ORG, and moreover, the density error caused by whether to form the dot is distributed to the periphery of the attention pixel to thereby globally be resolved. Therefore, the image (the image MRGG in FIG. 3) processed by the error diffusion method becomes a high-quality image excellent in resolution and reproducibility of contrasting density.

The processing in the steps S220 through S290 described hereinabove is first repeated (steps S210s through 210e) from the head to the tail of the raster while incrementing the coordinate x representing the position in the main scanning direction. When the position x of the attention pixel * has reached the tail of the raster, then, the coordinate y representing the position of the raster is incremented by a value of 1, the position x of the attention pixel * is reset to a value of 0, and then, the processing described above is performed. This is repeatedly performed (step S200s through 200e) from the head raster (y=0) to the last raster (y=yn). As a result, since the dot data DD(x,y) is formed in a predetermined area of the RAM 35, when performing the combining process (step S130) and the printing process (step S140) described above, the image MRGG as a halftone image corresponding to the original image ORG is formed on the printing medium P.

In the present embodiment, as described above, the error diffusion method is used as halftoning for converting the original image ORG as a multi-tone image into the dot data DD. In the error diffusion method, the conversion into the dot data DD is performed by comparing the grayscale value of the attention pixel with the threshold value ThE. In the present embodiment, the threshold value ThE is made to vary in value in accordance with the pixel position. The details of the calculation (step S300) of such a threshold value ThE will be described.

Figure 6:
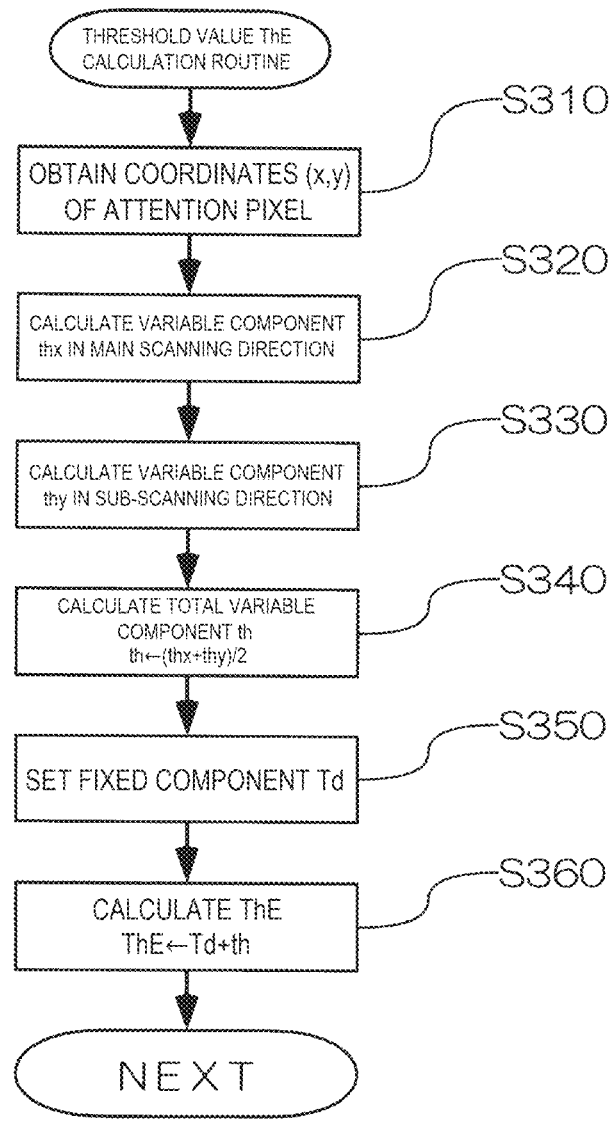
FIG. 6 is a flowchart showing a threshold value calculation routine for deciding a threshold value in the error diffusion process.

FIG. 6 shows calculation processing of the threshold value ThE. When starting the calculation processing, first, processing of obtaining the coordinates (x,y) of the attention pixel * is performed (step S310). Based on the coordinates (x,y) of the attention pixel *, calculation (step S320) of a variable component thx in the main scanning direction of the threshold value ThE and calculation (step S330) of a variable component thy in the sub-scanning direction are performed. Specific calculation is performed using the following formulas (3), (4).

$$thx = tv \cdot \cos\{\mod(x,T) \cdot 2\pi/T\} \quad (3)$$

$$thy = tv \cdot \cos\{\mod(y,T) \cdot 2\pi/T\} \quad (4)$$

Here, tv is an amplitude value of the variable component, and is assumed in the present embodiment to be a constant value of 8 regardless of the magnitude of the image data. Further, the function mod(x, T) is a function of obtaining a remainder when dividing the x coordinate in the main scanning direction by the variation period T. In the present embodiment, the variation period T is the value of 4 as obtained in the step S120 in FIG. 2. According to the formulas (3), (4), every time the coordinate x in the main scanning direction and the coordinate y in the sub-scanning direction is incremented by the value of 1, the component (5) described below in each of the formulas periodically changes in value in such a manner as 1→0→−1→0→ . . . .

$$\cos\{\mod(x,4) \cdot \pi/2\} \quad (5)$$

Therefore, taking the amplitude value tv into consideration, the variable component of the threshold value ThE periodically changes in such a manner as 8→0→−8→0→ . . . .

Figure 7:
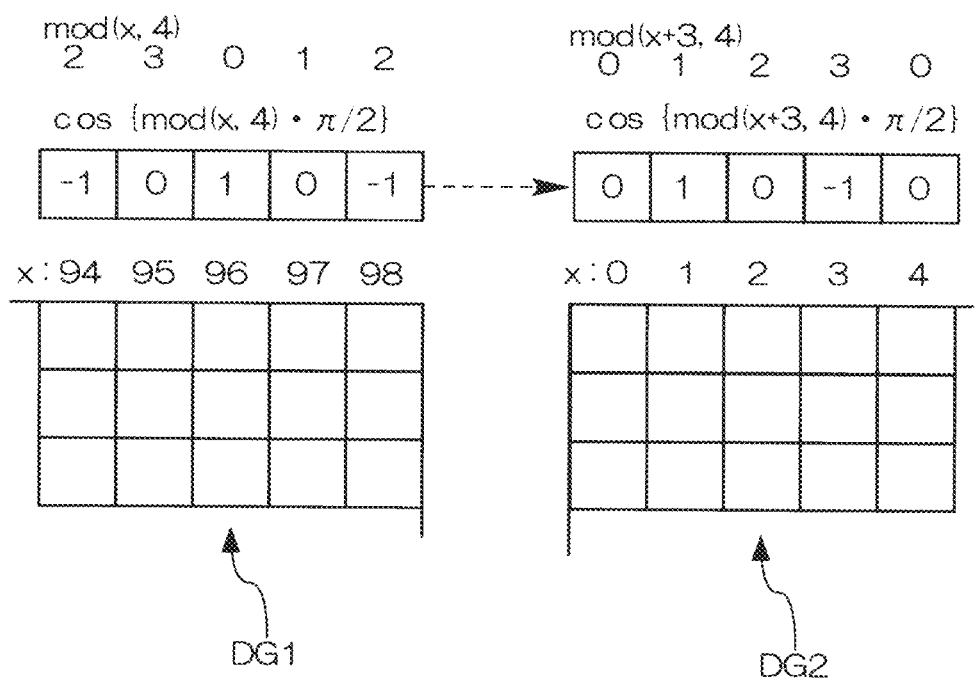
FIG. 7 is an explanatory diagram showing an example of a phase corresponding to a variation of the threshold value in a boundary between divided images.

FIG. 7 illustrates this state. The left-hand part of the illustration shows how the variable component thx of the threshold value ThE changes with respect to x=94 through 98 in the vicinity of the end (x=xm) of the raster in the first block DG1. The uppermost column shows the value of mod(x, 4), and the next column shows a value of the component described as (5) in that case. It should be noted that the variable component thy in the sub-scanning direction also changes in accordance with the coordinate y of the pixel in a similar manner.

The right-hand part of FIG. 7 shows how the variable component thx of the threshold value ThE changes with respect to x=0 through 4 in the vicinity of the start (x=0) of the raster in the second block DG2. As having already been described, when the coordinate xm of the pixel at the end of the first block DG1 takes a value of 98, the displacement a takes a value of 3, and therefore, regarding the second block DG2, the variable component thx is obtained using a formula (3a) obtained by correcting the formula (3) described above with the displacement a.

$$thx = tv \cdot \cos\{\mod(x+\alpha,T) \cdot 2\pi/T\} = tv \cdot \cos\{\mod(x+3,4) \cdot \pi/2\} \quad (3a)$$

By using the displacement a in such a manner, the variable components thx applied to the first block DG1 and the second block DG2 adjacent to the first block DG1 coincide in phase with each other.

After obtaining the variable components thx, thy of the threshold value ThE in such a manner, then, there is performed (step S340) processing of obtaining a total variable component th of the threshold value ThE in the attention pixel*(x,y) using the both of the variable components thx, thy. In the present embodiment, the total variable components th is obtained as an arithmetic average of the variable component thx in the main scanning direction and the variable component thy in the sub-scanning direction. Obviously, the total variable component can be obtained as a geometric mean, or can also be obtained as a weighted mean differently weighted between directions. Then, processing of obtaining a fixed component Td of the threshold value ThE set fixedly is performed (step S350) with respect to the total variable component th thus obtained, and then the calculation of adding the fixed component Td and the total variable component th to each other to obtain the threshold value ThE is performed (step S360).

Due to the processing described above, the threshold value ThE to be used in the error diffusion processing routine having already been described is obtained (step S300 in FIG. 4). In the present embodiment, the fixed component Td is set as the following formula (6) with respect to the image data Ds corresponding to the grayscale value of the image.

$$Td = 16 + Ds \cdot 7/8 \quad (6)$$

Making the threshold value ThE correlated to the grayscale value of the image data is effective for resolving a phenomenon such as tailing which can be caused by the halftone processing using the error diffusion method. It should be noted that the fixed component Td can uniformly be set to a value of 128 regardless of the value of the image data.

According to the printer 20 related to the first embodiment described hereinabove, the error diffusion method is adopted in the halftone processing, the original image ORG to be processed is divided in the main scanning direction into the first block DG1 and the second block DG2, and the first processing section 51 and the second processing section 52 respectively process the first block DG1 and the second block DG2 independently of each other. In other words, in the present embodiment, although the density error generated at the end and the vicinity of the end in the main scanning direction of the first block DG1 is not at all diffused to the second block DG2, the deterioration hardly occurs in the image quality on the boundary line in which the image is divided in the image MRGG obtained by combining the first dot data DDT1 and the second dot data DDT2 obtained by the halftone processing. Specifically, the pseudo contour is prevented from occurring due to the disturbance of the dot arrangement, and the image quality of the image MRGG thus printed is hardly inferior to when performing the halftone processing using the error diffusion method without dividing the original image ORG.

Figure 8:
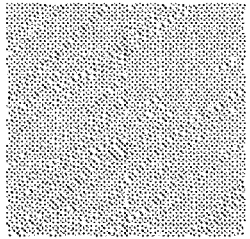
FIG. 8 is an explanatory diagram illustrating conditions of images processed together with respective reference examples.

An example of the image thus processed is shown in FIG. 8. In the drawing, the reference symbol C1 represents when the original image ORG is a homogenous image with the grayscale value of 64 when the grayscale range of the image to be handled by the printer 20 is 0 through 255, and the reference symbol C2 represents when the original image ORG is also a homogenous image with the grayscale value of 84. Further, in each of the images, a left-hand part is the image of the first block DG1, and the right-hand part is the image of the second block DG2 adjacent thereto. Further, the fields represented as FIX show when the variable components thx, thy of the threshold value ThE are each a value of 0, and the threshold value ThE includes the fixed component Td alone. Therefore, the threshold value ThE is decided by the formula (6) described above with respect to the image data Ds of the original image ORG as a result. Specifically, the threshold value ThE with respect to the image C1 with the grayscale value of 64 is a value of 72, and the threshold value ThE with respect to the image C2 with the grayscale value of 84 is a value of 89. As shown in the drawing, in this case, a disturbance exists in the arrangement of the dots between the first block DG1 and the second block DG2, and the pseudo contour is perceived, and thus, the image quality deteriorates.

Further, in the drawing, the fields represented as $\Delta\theta=0$ show an example of the processing according to the first embodiment. In other words, in these fields, the variable components thx, thy of the threshold value ThE are both given by the formula (3) or (3a), and the formula (4) described above, and at the same time, the phase difference $\Delta\theta$ of the variation period T in that case takes a value of 0 between the first block DG1 and the second block DG2, namely these fields correspond to the processing result when no phase difference exists. In this case, in either of the images C1, C2, the deterioration of the image quality such as the pseudo contour in the boundary between the first block DG1 and the second block DG2 is prevented from occurring, and is hardly visible. The fields represented as $\Delta\theta=n$ in the drawing show a comparative example, and correspond to a processing result when the variable components thx, thy of the threshold value ThE are both given by the formula (3) or (3a), and the formula (4) described above, and at the same time, the phase in the first block DG1 and the phase in the second block DG2 of the variation period T in that case are shifted as much as n from each other. In this case, in either of the images C1, C2, the pseudo contour occurs in the boundary between the first block DG1 and the second block DG2, and thus, occurrence of the deterioration of the image quality is observed.

As described hereinabove, it is possible for the printer 20 according to the first embodiment to divide the original image ORG into a plurality of parts, two parts here, specifically the first block DG1 and the second block DG2, and then perform the halftone processing using the error diffusion method on the first block DG1 and the second block DG2 independently and in parallel to each other, and thus, the processing of the error distribution is not required between the blocks adjacent to each other. Therefore, it is possible to reduce the time necessary for the halftone processing, and further, it is possible to appreciate the advantage of the high image quality due to the error diffusion method. It should be noted that it is possible to divide the original image ORG into three or more blocks. In such a case, it is sufficient to prepare the processing sections similar to the first processing section 51 and the second processing section 52 as much as at least the number equal to the division number of the image in total.

[3] Modified Examples

In the first embodiment described hereinabove, the displacement a is obtained so that the variation period T of the threshold value ThE with respect to the first block DG1 and the variation period T of the threshold value ThE with respect to the second block DG2 become in-phase with each other, and then the variable component thx, and by extension, the threshold value ThE are calculated using the formula (3a) with respect to the second block DG2. In contrast, it is also possible to arrange that the number of pixels in the main scanning direction of the first block DG1 is set to a multiple of the number of pixels representing the variation period T when dividing the original image ORG, and thus, the variable component of the threshold value ThE is obtained in the same phase from the start of the raster with respect to both of the first block DG1 and the second block DG2. In other words, it is possible to arrange to obtain the variable components thx, thy using the same formulas (3), (4) with respect to the first and second blocks DG1, DG2. Such a number of pixels in the main scanning direction of the first block DG1 can be set in advance to a predetermined value, or can be set as the number of pixels the most approximate to a multiple of the number of pixels representing the variation period T with respect to the number of pixels obtained by dividing the original image ORG into equal blocks. Since the first processing section 51 and the second processing section 52 perform the processing in parallel to each other, when making the first block DG1 and the second block DG2 approximate in size to each other, it is possible to make the time taken to complete the halftone processing of the whole of the original image ORG shorter than when the first block DG1 and the second block DG2 are significantly different in the number of pixels in the main scanning direction from each other.

Further, although in the embodiment described above, it is assumed that the variation period T corresponds to the number of pixels of 4, it is also possible to make the variation period T correspond to the number of pixels of 8 when the resolution of the image to be printed is, for example, 600 dpi. Even in this case, the spatial frequency becomes about 3/mm. The relationship between the coordinate of the pixel and the variable component thx in this case is illustrated in FIG. 9. The drawing shows how the variable component thx of the threshold value ThE changes with respect to x=90 through 98 in the vicinity of the end (x=xm) of the raster in the first block DG1. The uppermost column shows the value of mod(x, 8), and the next column shows a value of the component described as (5) in that case. It should be noted that the same applies to the variable component thy in the sub-scanning direction of the threshold value ThE.

Also in this case, the phase of the variation period T applied to the second block DG2 adjacent thereto is set so as to become continuous with the variation period T to be applied to the first block DG1. By adopting such a configuration, it is possible to realize speeding up of the halftone processing and suppression of the deterioration in image quality similarly to the case of the variation period T. Moreover, in this example, the resolution of the image to be printed is high, and the quality of the image printed can be made higher. It should be noted that the spatial frequency of the variation becomes about 3/mm in this example since the variation period T is set to 8 pixels while the resolution of the print image is 600 dpi, but when setting the variation period T to 6 pixels or 4 pixels, it is possible to make the spatial frequency of the variation higher, and the deterioration in image quality between the blocks can be made more inconspicuous.

B. Second Embodiment

Figure 10:
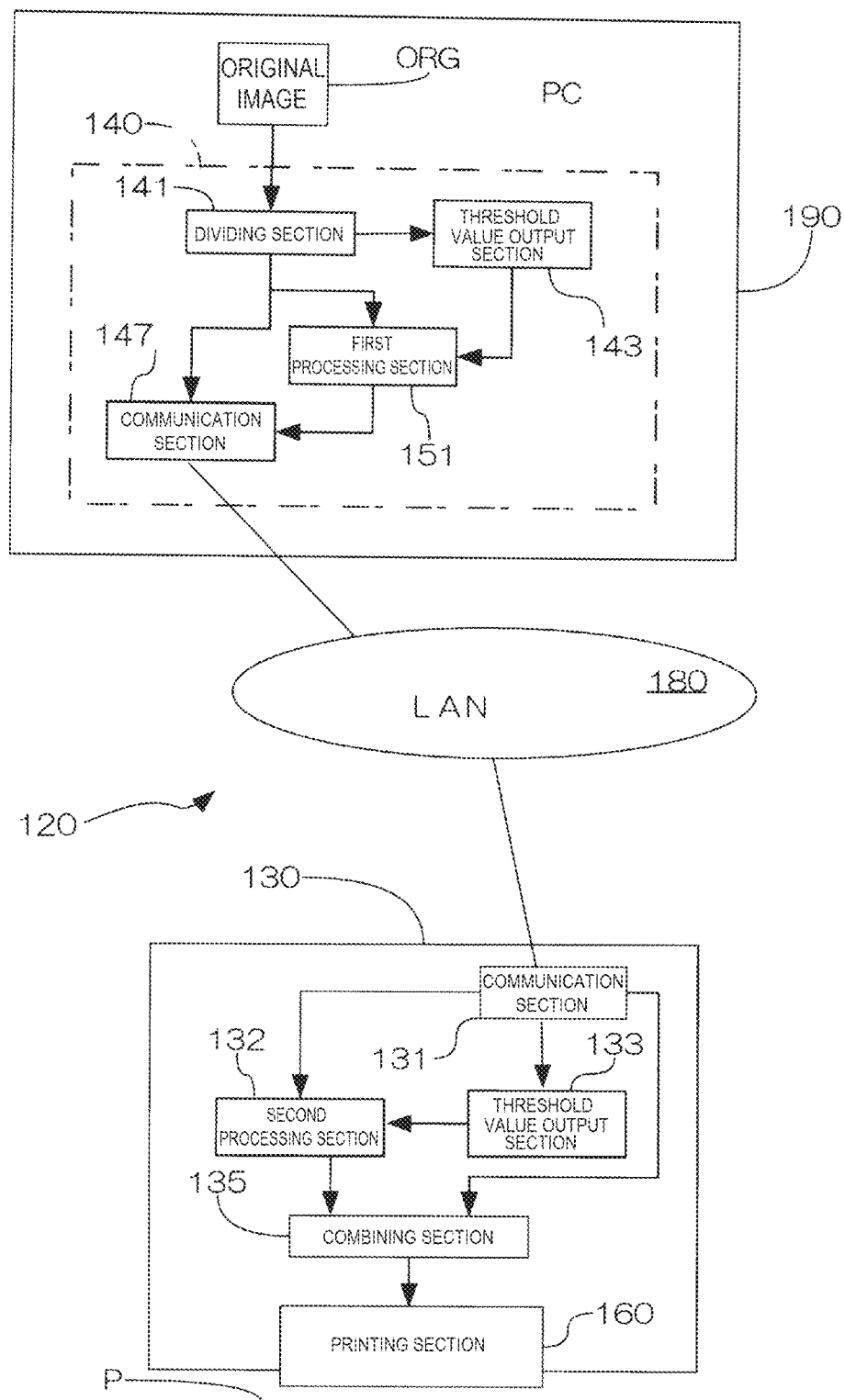
FIG. 10 is a schematic configuration diagram showing an image processing system according to a second embodiment.

Then, a second embodiment will be described. FIG. 10 is a schematic configuration diagram of a printing system 120 according to the second embodiment. As shown in the drawing, the printing system 120 is constituted by a computer (PC) 190 and a printer 130 connected to each other via a network (LAN) 180. The PC 190 is for creating/editing the original image ORG, and is provided with a control section 140 inside. It should be noted that although not shown in the drawing, the control section 140 is also provided with a memory such as a ROM for storing a program and a RAM in which the image data and so on are developed similarly to the first embodiment.

The PC 190 is provided with a dividing section 141 for dividing the original image ORG, a threshold value output section 143, a first processing section 151, and a communication section 147 inside the control section 140. Similarly to the first embodiment, each of the sections is realized by the CPU executing the program stored in the ROM. The threshold value output section 143 outputs the threshold value ThE varying at the variation period T similarly to the first embodiment to the first processing section 151 for performing the halftone processing using the error diffusion method. The first processing section 151 performs the halftone processing on the first block DG1 as one of the blocks divided into, and then outputs the result as the first dot data DDT1 representing whether to form the dot. The communication section 147 is for communicating with the printer 130 via the LAN 180, and outputs image data of the second block DG2 as the other of the blocks thus divided into, and the first dot data DDT1 as the result of the processing by the first processing section 151 to the printer 130. The dividing section 141 divides the original image ORG into two similarly to the first embodiment. In the second embodiment, the division of the original image ORG is performed so that the number of pixels in the main scanning direction becomes a multiple of the variation period T of the threshold value ThE. Also in the present embodiment, the original image ORG is processed after divided into two, but the original image ORG can be divided into three or more similarly to the first embodiment.

The printer 130 which cooperates with the PC 190 to constitute the printing system 120 is provided with a communication section 131 for performing the communication via the LAN 180, a second processing section 132 for performing substantially the same processing as that of the first processing section 151, a threshold value output section 133 for outputting the threshold value ThE for the halftone processing using the error diffusion method to the second processing section 132, a combining section 135 for combining the divided images using the dot data, a printing section 160 for performing printing on the print medium, and so on. Except the printing section 160, each of the sections is realized by a CPU provided to the printer 130 executing a program prepared in a ROM. The printing section 160 is provided with necessary hardware as a serial type inkjet printer.

Figure 11:
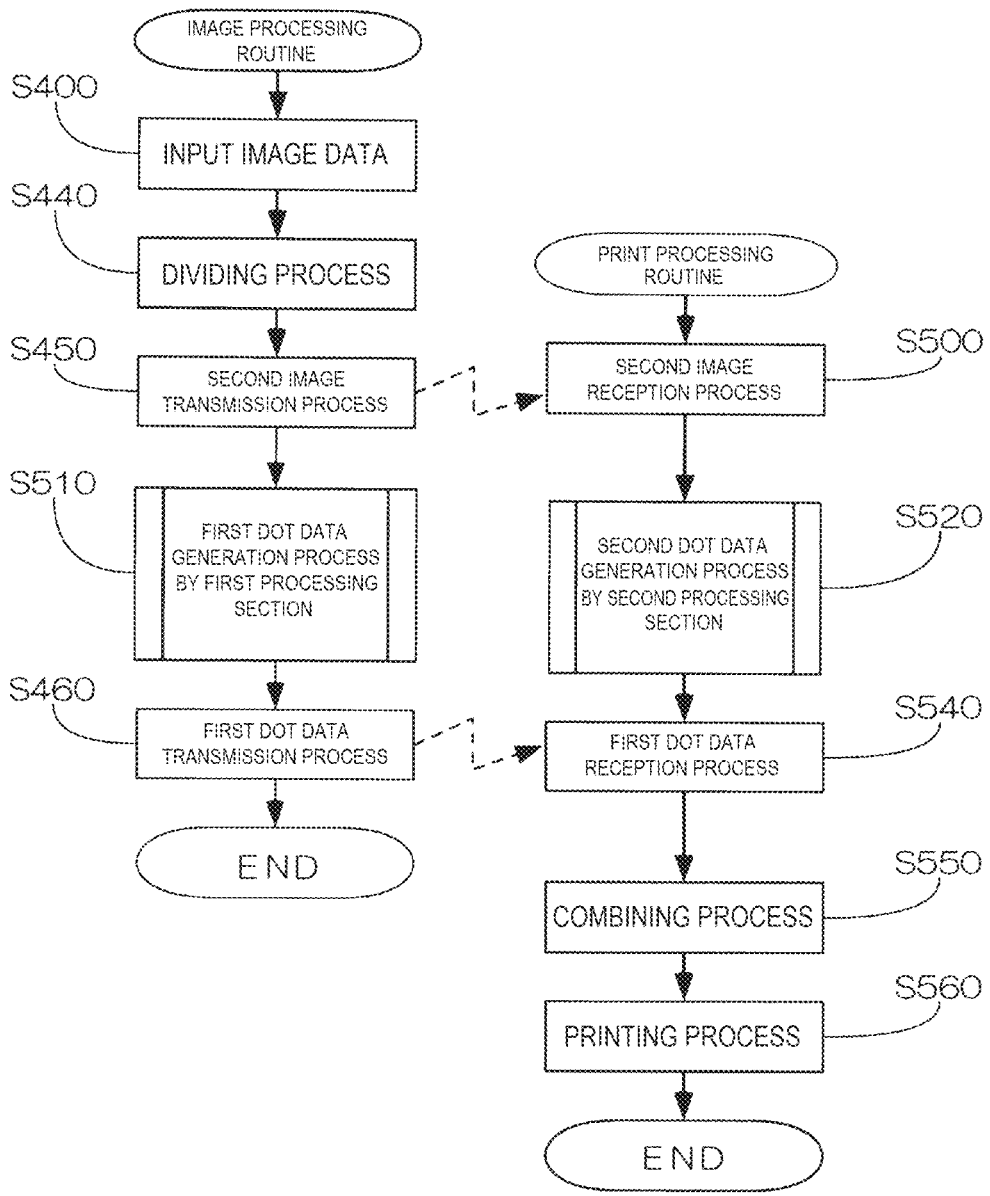
FIG. 11 is a flowchart showing processing in a computer for outputting an image and processing of a printer for printing the image in association with each other.

FIG. 11 shows the processing in the PC 190 and the processing in the printer 130 in contrast with each other, wherein the PC 190 and the printer 130 constitute the printing system 120. In the illustrated processing, an "image processing routine" is processing executed by a printer driver prepared as a device driver when an instruction of printing is made after editing or the like is performed on the image in the PC 190. Further, a "print processing routine" is processing executed by the printer 130 in response to the instruction from the PC 190.

When the printer driver of the PC 190 receives the instruction of printing, the printer driver first performs (step S400) processing of inputting image data of the original image ORG. Also in the second embodiment, the resolution conversion process (step S110 in FIG. 2), the processing (step S120) of deciding the variation period T, and further, the color conversion process (step S130) and so on are performed similarly to the first embodiment, but the illustration and the explanation of the above will be omitted. It should be noted that in the second embodiment, since the division of the original image ORG is performed so that the number of pixels in the main scanning direction of the first block DG1 becomes a multiple of the variation period T of the threshold value ThE, the displacement a is not calculated.

The printer driver performs the processing such as the resolution conversion and the decision of the variation period T of the threshold value ThE, and then performs (step S440) the processing of dividing the original image ORG. This processing is also substantially the same as in the first embodiment. Due to the dividing process, the original image ORG is divided into the first block DG1 and the second block DG2. Therefore, there is performed (step S450) a second image transmission process of packetizing the image data of the second block DG2 and then transmitting the image data thus packetized to the printer 130 using the communication section 147. Subsequently, the PC 190 performs the halftone processing on the image data of one not transmitted, namely the first block DG1, using the first processing section 151 to generate (step S510) the first dot data DDT1 representing whether to form the dot.

The printer 130 monitors the communication via the LAN 180 with the communication section 131, and when a packet directed to the printer 130 comes in, the printer 130 receives (step S500) the packet. This corresponds to a second image reception process. When the printer 130 receives the second block DG2 having sent from the PC 190, the printer 130 performs the halftone processing using the second processing section 132 to generate (step S520) the second dot data DDT2 representing whether to form the dot. The time taken to complete the generation of the second dot data DDT2 at the printer 130 side and the time taken to complete the generation of the first dot data DDT1 at the PC 190 side are different from each other depending on the processing capacities of the CPU and so on of the both sides. In any case, the processing at both sides is completed within a predetermined time.

When the generation of the first dot data DDT1 is completed, the PC 190 transmits (step S460) the first dot data DDT1 to the printer 130, and when the transmission is completed, the PC 190 terminates the image processing routine. On the other hand, the printer 130 receives (step S540) the first dot data DDT1 sent from the PC 190 when the generation of the second dot data DDT2 is completed (step S520). It should be noted that when the processing of generating the first dot data DDT1 by the PC 190 is completed in a short time, it is possible for the printer 130 to receive the first dot data DDT1 in parallel to the halftone processing using the second processing section 132 in response to the transmission of the first dot data DDT1 from the PC 190 without waiting for the completion of the generation of the second dot data DDT2. The first dot data DDT1 thus received is stored in a predetermined area of the RAM of the printer 130, and is then output to the combining section 135 similarly to the second dot data DDT2 generated by the second processing section 132.

The printer 130 combines (step S550) the first dot data DDT1 and the second dot data DDT2 with each other using the combining section 135. In the combining process, the first dot data DDT1 and the second dot data DDT2 are arranged so that the respective raster lines coincide with each other. The dot data on which the combining process has been performed is once stored in the RAM of the printer 130, then retrieved in a printing process (step S560) to subsequently be performed, and is sequentially sent to the printing section 160. The printing section 160 forms the image on the print medium based on the dot data. After the completion of the printing process (step S560), the printer 130 terminates the print processing routine.

According to the second embodiment described hereinabove, similarly to the first embodiment, there is exerted an advantage that it is possible to divide the original image ORG into the two blocks to perform the halftone processing using the error diffusion method independently block by block, and further, it is possible to suppress the deterioration of the image quality at the j unction between the blocks. Moreover, in the second embodiment, the halftone processing is performed in the different devices such as the PC 190 and the printer 130 exploiting such a characteristic that the halftone processing using the error diffusion method can be performed independently block by block. Therefore, it is possible to process the original image ORG combining the devices coupled to each other with the network or the like, and thus, it is possible to fulfill the two requirements of the fast image processing and the sustention of the high quality combining a plurality of devices with each other.

In the embodiment described above, the original image ORG is divided into two, and the first block DG1 is processed by the PC 190, and the second block DG2 is processed by the printer 130. Therefore, due to a difference in processing capacity between the both devices, there can arise a difference in termination time of the processing in some cases. Therefore, it is possible to arrange to divide the original image ORG so that the halftone processing terminates around the same time taking the difference in capacity for the halftone processing between the PC 190 and the printer 130 into consideration. For example, when the PC 190 is higher in processing capacity, it is sufficient to perform the division so that the first block DG1 becomes larger than the second block DG2. This makes it possible to approximate the timings of the completion of the processing in the both devices to each other, and thus, it is possible to further shorten the processing time as the printing system 120.

C. Other Configuration Examples

In the first embodiment, the first processing section 51 and the second processing section 52 are disposed inside the same printer 20, and in the second embodiment, the first processing section 151 and the second processing section 132 are respectively disposed in the different devices. In any case, there is no need for the plurality of processing sections to exchange the density error caused by performing the halftone processing using the error diffusion method in the junction between the blocks divided into and in the vicinity of the junction. Therefore, even when increasing the number of processing sections for performing the halftone processing using the error diffusion method, it is sufficient to divide the original image ORG in accordance with the number of the processing sections and then provide the result, and thus, the number of the processing sections can arbitrarily be increased and decreased as needed. In other words, it is possible to configure the image processing device and the printing device using the image processing device in a so-called scalable manner. Therefore, when disposing the processing section for performing the halftone processing using the error diffusion method for every print head, for example, it becomes possible to realize the printing device in a scalable manner. For example, when manufacturing a unit in which an image processing section is incorporated in a print head having a print range corresponding to a portrait A4 sheet, it is sufficient to dispose two such printing units side by side in order to achieve a print range of a portrait A2 sheet. In this case, there is no need to exchange the density error between the printing units. Further, in order to achieve a print range of portrait A0 sheet, it is sufficient to dispose four such printing units side by side.

In each of the embodiments described above, the variable components of the threshold value ThE are each provided as a cosine function based on the coordinate of the pixel as shown in the formulas (3), (4), but it is possible to use a sine function. Further, it is possible to use a triangle wave. Alternatively, when the number of pixels corresponding to the variation period T is small, it is possible to adopt an approximation with a rectangular wave. In the embodiments described above, the threshold value ThE is varied, but it is also possible to arrange to add a variable component to the image data, and then compare the result with the threshold value. Further, in each of the embodiments described above, the amplitude value tv is multiplied in order to obtain the variable components thx, thy as shown in the formulas (3), (4), but it is possible for the amplitude value tv to be different between the variable component thx in the main scanning direction and the variable component thy in the sub-scanning direction. Further, the amplitude value tv can be a fixed value, or can also be arranged to be selected from a plurality of amplitude values such as low, middle, and high values in accordance with the grayscale value of the image, or can also be a value proportional to the grayscale value. In the latter case, for example, it is possible to adopt a value about 5 through 50% of the grayscale value of the pixel on which the halftone processing is performed.

Further, it is possible for the amplitude value tv to be different between the variable component thx in the main scanning direction and the variable component thy in the sub-scanning direction. Besides the above, regarding the blocks thus divided into, the phase of the variation period T at the origin position (0,0) of the area in which the halftone processing using the error diffusion method is performed can be shifted between the main scanning direction and the sub-scanning direction. Further, it is possible for the variation period T itself to be different between the main scanning direction and the sub-scanning direction.

In the embodiments described above, the variable components thx, thy of the threshold value ThE are provided by the formulas (3), (4), but there is no need to use the function, and it is also possible to arrange to decide the variable components thx, thy in the variation period T in advance, and select the variable components thx, thy in accordance with the coordinate of the attention pixel. This makes it unnecessary to perform the calculation using the function when obtaining the threshold value ThE, and thus the calculation processing can be simplified. Further, it is not required to provide the variable components thx, thy of the threshold value ThE to the entire range of the image, and it is possible to arrange to provide the variable components thx, thy only to a predetermined range from the adjacent image (block). This makes it possible to partially omit the calculation processing for obtaining the threshold value ThE.

D. Other Embodiments (1) An image processing device according to the present disclosure can be implemented in the following aspect. A first aspect is an aspect as an image processing device for processing an image constituted by a plurality of pixels arranged two-dimensionally. The image processing device includes a dividing section configured to divide the image into a plurality of blocks, a first processing section configured to compare image data representing a gray level of the pixel included in a first block as one of the blocks divided into with a first threshold value prepared in advance, and convert the image data into first dot data representing whether to form a dot using an error diffusion method, and a second processing section configured to perform processing of comparing image data representing a gray level of the pixel included in a second block as a block adjacent to the first block with a second threshold value prepared in advance, and converting the image data into second dot data representing whether to form a dot using an error diffusion method independently of the first processing section, wherein the first threshold value and the second threshold value in the first and second processing sections include variable components periodically varying along two-dimensional arrangement directions of the pixels, respectively, and the variable components are provided with the same phase at a junction between the first block and the second block.

According to this image processing device, since the first threshold value and the second threshold value are made to include the variable components periodically varying respectively along the two-dimensional arrangement directions of the pixels, and the variable components are provided with the same phase at the junction between the first block and the second block, even when performing the conversion into the dot data using the error diffusion method in the plurality of blocks independently of each other, it is possible to prevent the image quality deterioration such as occurrence of the pseudo contour from occurring at the junction between the first block and the second block. Since it is possible to perform the processing using the error diffusion method on the plurality of blocks independently of each other, it is easy to achieve the parallelization of the processing, and it is possible to achieve both of the reduction in processing time and the suppression of the image quality deterioration. As a result, it becomes also possible to configure the image processing device in a scalable manner.

(2) In such an image processing device, the variable components may be one of a positive value and a negative value obtained based on one of a sine wave and a cosine wave, and may be added to fixed values deciding the first threshold value and the second threshold value, respectively. According to this configuration, it is possible to easily generate the components varying periodically. Obviously, it is possible to generate the variable components based on a triangle wave or a rectangular wave.

(3) In such an image processing device, the fixed value may be one of a constant value independent of a magnitude of the image data of the pixel and a value decided in accordance with the magnitude of the image data. When using the value independent of the magnitude of the image data as the fixed value, the calculation becomes easy. In contrast, when deciding the fixed value in accordance with the magnitude of the image data, this is helpful to resolve the tailing which can occur in the error diffusion method. The tailing means a phenomenon that the accumulated error occurs as if tailing from a position of a switching of a region at a certain interval when, for example, switching from a region high in grayscale value to a region low in grayscale value as low as approximately zero. When making the threshold value correspond to the magnitude of the image data, the generation of the dot due to the accumulated error becomes earlier, and the tailing becomes difficult to occur. Making the fixed value correspond to the magnitude of the image data not only includes making the fixed value proportional to the magnitude of the image data using a function, but also includes switching the fixed value in a stepwise manner like low, middle, and high, or a configuration of providing an arbitrary correspondence relationship using a map.

(4) In such an image processing device, a spatial frequency f of the variable components may be no lower than 3/mm. It is known that the sensitivity of human eyes is sensitive to a change with a low spatial frequency, and in particular, regarding an image, the sensitivity of human eyes is highly sensitive to a change with about 1/mm. Therefore, when making the spatial frequency of the variable components no lower than 3/mm, it is difficult for the variation in dot data due to the variable components of the threshold value to be sensed. Obviously, when adopting the spatial frequency lower than the above, it is possible to obtain the advantage that the image quality deterioration at the junction between the first block and the second block can be suppressed.

(5) In such an image processing device, the first processing section and the second processing section may be respectively incorporated in separate devices which operate independently of each other. The first processing section and the second processing section process the image using the error diffusion method, but are not required to exchange the error at the junction. Therefore, when incorporating the first processing section and the second processing section respectively in the separate devices which operate independently of each other, there is no need to prepare a configuration such as a shared memory for exchanging the error to be diffused. Therefore, it is possible to make the first processing section and the second processing section operate independently of each other, and it is possible to make them operate even when incorporating them respectively in the separate devices. This is true even when the division number of the image becomes three or more, and a third processing section, a fourth processing section, and so on are provided. In other words, the processing sections each have a scalable structure easy to add as needed. The separate devices which operate independently of each other can be coupled to each other with a dedicated line, or coupled to each other with a multi-purpose communication line, LAN, or the like regardless of wired/wireless. Alternatively, it is possible to arrange to provide the processing section to each of the printing heads, add the processing sections in accordance With the size of the printing device to perform the printing process.

(6) A second aspect of the present disclosure is an aspect as a printing device. This printing device includes any one of the image processing devices described above, and a dot formation section configured to form a dot on a print medium in accordance with the first and second dot data obtained by performing the conversion. Since the printing device is capable of dividing the image to be printed into a plurality of parts and then processing the image, it is possible to reduce the time necessary for printing, and further, it is possible to suppress the deterioration of the quality of the image printed, in particular, the quality at the junction between the images thus divided into.

(7) A third aspect of the present disclosure is an aspect as a printing system. This printing system includes a dividing section configured to divide an original image constituted by a plurality of pixels arranged two-dimensionally into a plurality of blocks, a first processing section configured to compare first image data representing a gray level of the pixel included in a first block as one of the blocks divided into with a first threshold value prepared in advance, and convert the first image data into first dot data representing whether to form a dot using an error diffusion method, a second processing section configured to perform processing of comparing second image data representing a gray level of the pixel included in a second block as a block adjacent to the first block with a second threshold value prepared in advance, and converting the second image data into second dot data representing whether to form a dot using an error diffusion method, and a printing section configured to combine the first dot data received and the second dot data with each other to print an image corresponding to the original image on a print medium, wherein the first processing section and the second processing section are respectively disposed in a first device and a second device coupled to each other via a line, and the first threshold value and the second threshold value in the first and second processing sections include variable components periodically varying along two-dimensional arrangement directions of the pixels, respectively, and the variable components are provided with the same phase at a junction between the first block and the second block.

According to this printing system, since it is possible for the first device and the second device to share the image processing using the error diffusion method, it is possible to realize the reduction of the time taken to complete the printing, and the suppression of the deterioration of the image quality of the image printed, in particular, the image quality at the junction of the images thus divided into.

(8) In such a printing system, the first device may be a computer configured to handle the original image, and may include the dividing section and the first processing section, the second device may be a printer, and may include the second processing section and the printing section, the computer may further include a transmission section configured to transmit the second image data and the first dot data to the printer, and the printer may further include a reception section configured to receive the second image data and the first dot data. According to this printing system, it is easy to achieve both of the reduction of the printing time and the suppression of the image quality deterioration in a typical configuration in printing, namely a computer and a printer.

(9) A fourth aspect of the present disclosure is an aspect as an image processing method. The image processing method is an image processing method of processing an image constituted by a plurality of pixels arranged two-dimensionally, including the steps of dividing the image into a plurality of blocks, performing first processing of comparing image data representing a gray level of the pixel included in a first block as one of the blocks divided into with a first threshold value prepared in advance, and converting the image data into first dot data representing whether to form a dot using an error diffusion method, and performing processing of comparing image data representing a gray level of the pixel included in a second block as a block adjacent to the first block with a second threshold value prepared in advance, and converting the image data into second dot data representing whether to form a dot using an error diffusion method independently of the first processing, wherein the first threshold value and the second threshold value include variable components periodically varying along two-dimensional arrangement directions of the pixels, respectively, and the variable components are provided with the same phase at a junction between the first block and the second block. By adopting this configuration, it is possible to achieve the reduction of the processing time in the image processing and suppression of the image quality deterioration at the junction between images thus divided into. Further, since it is possible to perform the processing using the error diffusion method on the plurality of blocks independently of each other, it is easy to achieve the parallelization of the processing, and it is possible to achieve both of the reduction in processing time and the suppression of the image quality deterioration. As a result, it becomes also possible to configure the image processing device in a scalable manner.

(10) In each of the embodiments described above, it is possible to replace a part of the configuration realized by hardware with software. At least a part of a configuration realized by software can be realized by a discrete circuit configuration. Further, when a part or the whole of the function of the present disclosure is realized by software, the software (the computer program) can be provided in a form of being stored in a computer-readable recording medium. The "computer-readable recording medium" is not limited to a portable recording medium such as a flexible disk or a CD-ROM, but includes an internal storage device in the computer such as a variety of types of RAM or ROM, and an external storage device fixed to the computer such as a hard disk drive. In other words, the "computer-readable recording medium" has broad meaning including an arbitrary recording medium capable of fixing a data packet in a non-transitory manner.

The present disclosure is not limited to the embodiments described above, but can be implemented with a variety of configurations within the scope or the spirit of the present disclosure. For example, the technical features in the embodiments corresponding to the technical features in the aspects described in SUMMARY section can appropriately be replaced or combined in order to solve all or a part of the problems described above, or in order to achieve all or a part of the advantages. Further, the technical feature can arbitrarily be eliminated unless described in the present specification as an essential element.

What is claimed is:

1. An image processing device configured to process an image constituted by a plurality of pixels arranged two-dimensionally, comprising:
   a dividing section configured to divide the image into a plurality of blocks;
   a first processing section configured to compare image data representing a gray level of the pixel included in a first block as one of the blocks divided into with a first threshold value prepared in advance, and convert the image data into first dot data representing whether to form a dot using an error diffusion method; and
   a second processing section configured to perform processing of comparing image data representing a gray level of the pixel included in a second block as a block adjacent to the first block with a second threshold value prepared in advance, and converting the image data into second dot data representing whether to form a dot using an error diffusion method independently of the first processing section, wherein
   the first threshold value and the second threshold value in the first and second processing sections include variable components periodically varying along two-dimensional arrangement directions of the pixels, respectively, and the variable components are provided with the same phase at a junction between the first block and the second block.

2. The image processing device according to claim 1, wherein
   the variable components are one of a positive value and a negative value obtained based on one of a sine wave and a cosine wave, and are added to fixed values deciding the first threshold value and the second threshold value, respectively.

3. The image processing device according to claim 2, wherein
   the fixed value is one of a constant value independent of a magnitude of the image data of the pixel and a value decided in accordance with the magnitude of the image data.

4. The image processing device according to claim 1, wherein
   a spatial frequency f of the variable components is no lower than 3/mm.

5. The image processing device according to claim 1, wherein
   the first processing section and the second processing section are respectively incorporated in separate devices which operate independently of each other.

6. A printing device comprising:
   the image processing device according to claim 1; and
   a dot formation section configured to form a dot on a print medium in accordance with the first and second dot data obtained by performing the conversion.

7. A printing system comprising:
   a dividing section configured to divide an original image constituted by a plurality of pixels arranged two-dimensionally into a plurality of blocks;
   a first processing section configured to compare first image data representing a gray level of the pixel included in a first block as one of the blocks divided into with a first threshold value prepared in advance, and convert the first image data into first dot data representing whether to form a dot using an error diffusion method;
   a second processing section configured to perform processing of comparing second image data representing a gray level of the pixel included in a second block as a block adjacent to the first block with a second threshold value prepared in advance, and converting the second image data into second dot data representing whether to form a dot using an error diffusion method; and
   a printing section configured to combine the first dot data and the second dot data with each other to print an image corresponding to the original image on a print medium, wherein
   the first processing section and the second processing section are respectively disposed in a first device and a second device coupled to each other via a line, and
   the first threshold value and the second threshold value in the first and second processing sections include variable components periodically varying along two-dimensional arrangement directions of the pixels, respectively, and the variable components are provided with the same phase at a junction between the first block and the second block.

8. The printing system according to claim 7, wherein
   the first device is a computer configured to handle the original image, and includes the dividing section and the first processing section,
   the second device is a printer, and includes the second processing section and the printing section,
   the computer further includes a transmission section configured to transmit the second image data and the first dot data to the printer, and
   the printer further includes a reception section configured to receive the second image data and the first dot data.

9. An image processing method configured to process an image constituted by a plurality of pixels arranged two-dimensionally, comprising:
   dividing the image into a plurality of blocks;
   performing first processing of comparing image data representing a gray level of the pixel included in a first block as one of the blocks divided into with a first threshold value prepared in advance, and converting the image data into first dot data representing whether to form a dot using an error diffusion method; and
   performing processing of comparing image data representing a gray level of the pixel included in a second block as a block adjacent to the first block with a second threshold value prepared in advance, and converting the image data into second dot data representing whether to form a dot using an error diffusion method independently of the first processing, wherein
   the first threshold value and the second threshold value include variable components periodically varying along two-dimensional arrangement directions of the pixels, respectively, and the variable components are provided with the same phase at a junction between the first block and the second block.

* * * * *